United States Patent
Riguer et al.

(10) Patent No.: US 9,239,793 B2
(45) Date of Patent: Jan. 19, 2016

(54) MECHANISM FOR USING A GPU CONTROLLER FOR PRELOADING CACHES

(75) Inventors: Guennadi Riguer, Thornhill (CA); Yury Lichmanov, Richmond Hill (CA)

(73) Assignee: ATI TECHNOLOGIES ULC, Markham, Ontario (CA)

( * ) Notice: Subject to any disclaimer, the term of this patent is extended or adjusted under 35 U.S.C. 154(b) by 718 days.

(21) Appl. No.: 13/324,432

(22) Filed: Dec. 13, 2011

(65) Prior Publication Data

US 2013/0151787 A1    Jun. 13, 2013

(51) Int. Cl.
| | |
|---|---|
| G06F 13/00 | (2006.01) |
| G06F 13/28 | (2006.01) |
| G06F 12/08 | (2006.01) |
| G06T 1/60 | (2006.01) |

(52) U.S. Cl.
CPC ............ *G06F 12/0862* (2013.01); *G06T 1/60* (2013.01); *G06F 2212/302* (2013.01); *G06F 2212/6024* (2013.01); *G06F 2212/6028* (2013.01)

(58) Field of Classification Search
CPC .......... G06F 12/0862; G06F 2212/302; G06F 2212/6028; G06F 2212/6024
USPC .......................................... 711/137, E12.057
See application file for complete search history.

(56) References Cited

U.S. PATENT DOCUMENTS

| | | | |
|---|---|---|---|
| 6,157,987 A | 12/2000 | Krishnamurthy et al. | |
| 6,891,546 B1 | 5/2005 | Park et al. | |
| 2005/0010726 A1 | 1/2005 | Rai et al. | |
| 2005/0195200 A1 | 9/2005 | Chuang et al. | |
| 2006/0085602 A1 * | 4/2006 | Huggahalli et al. | 711/137 |
| 2007/0294516 A1 | 12/2007 | Barham | |
| 2010/0123717 A1 | 5/2010 | Jiao | |
| 2010/0153661 A1 | 6/2010 | Vamanan et al. | |
| 2011/0022817 A1 * | 1/2011 | Gaster et al. | 711/202 |
| 2011/0072218 A1 * | 3/2011 | Manne et al. | 711/136 |
| 2012/0137059 A1 | 5/2012 | Yang et al. | |

FOREIGN PATENT DOCUMENTS

| | | |
|---|---|---|
| WO | WO 2006/044743 A2 | 4/2006 |
| WO | WO 2011/017026 A1 | 2/2011 |
| WO | WO 2011/028984 A1 | 3/2011 |
| WO | WO 2012/040122 A1 | 3/2012 |

OTHER PUBLICATIONS

International Search Report and Written Opinion for International Application No. PCT/IB2012/002938, Canadian Intellectual Property Office, Canada, mailed on May 14, 2013 (11 pages).
EP Search Report mailed in corresponding EP Patent Application No. 12 866 001.6, mailed on Jul. 3, 2015, consisting of 7 pages.

* cited by examiner

*Primary Examiner* — Edward Dudek, Jr.
(74) *Attorney, Agent, or Firm* — Volpe and Koenig, P.C.

(57) ABSTRACT

Provided is a method and system for preloading a cache on a graphical processing unit. The method includes receiving a command message, the command message including data related to a portion of memory. The method also includes interpreting the command message, identifying policy information of the cache, identifying a location and size of the portion of memory, and creating a fetch message including data related to contents of the portion, wherein the fetch message causes the cache to preload data of the portion of memory.

17 Claims, 4 Drawing Sheets

MECHANISM FOR USING A GPU CONTROLLER FOR PRELOADING CACHES

BACKGROUND OF THE INVENTION

1. Field of the Invention

The present invention is generally directed to computing operations performed in computing systems. More particularly, the present invention is directed to graphics processing tasks performed in computing systems.

2. Background Art

A graphics processing unit (GPU) is a complex integrated circuit that is specially designed to perform graphics processing tasks. For example, a GPU can execute graphics processing tasks required by an end-user application, such as a video game application. The computational capabilities for GPUs have grown at a rate exceeding that of the corresponding central processing unit (CPU) platforms. This growth, coupled with the explosion of the mobile computing market (e.g., notebooks, mobile smart phones, tablets, etc.) and its necessary supporting server/enterprise systems, has been used to provide a specified quality of desired user experience.

However, GPUs have traditionally operated in a constrained programming environment, available primarily for the acceleration of graphics. These constraints arose from the fact that GPUs did not have as rich a programming ecosystem as CPUs. Their use, therefore, has been mostly limited to two dimensional (2D) and three dimensional (3D) graphics and a few leading edge multimedia applications, which are already accustomed to dealing with graphics and video application programming interfaces (APIs).

With the advent of multi-vendor supported OpenCL® and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of a CPU and a GPU to be used as fluidly as the CPU for most programming tasks.

In general, there are several layers of software between an end-user application and the GPU. The end-user application communicates with an application programming interface (API). An API allows the end-user application to output graphics data and commands in a standardized format, rather than in a format that is dependent on the GPU. The API communicates with a driver. The driver translates standard code received from the API into a native format of instructions understood by the GPU. The driver is typically written by the manufacturer of the GPU. The GPU then executes the instructions from the driver.

A standard GPU creates the pixels that make up an image from a higher level description of its components in a process known as rendering. GPUs typically utilize a concept of continuous rendering by the use of pipelines to process pixel, texture, and geometric data. These pipelines are often referred to as a collection of fixed function special purpose pipelines such as rasterizers, setup engines, color blenders, texture mapping and programmable stages that can be accomplished in shader pipes or shader pipelines. "Shader" is a term in computer graphics referring to a set of software instructions used by a graphic resource primarily to perform rendering effects. In addition, GPUs can also employ multiple programmable pipelines in a parallel processing design to obtain higher throughput. Multiple shader pipelines can also be referred to as a shader pipe array.

In addition, GPUs also support a concept known as texture mapping. Texture mapping is a process used to determine the texture color for a texture mapped pixel through the use of the colors of nearby pixels of the texture, or texels. The process is also referred to as texture smoothing or texture interpolation. However, high image quality texture mapping requires a high degree of computational complexity. Furthermore, GPUs equipped with a single (unified) shader also simultaneously support many types of shader processing. Thus raising the demand for higher performance generalized memory access capabilities.

The shader engines rely on high speed access to local cache memory for texture, shader code, and other types of data. Preloading a cache with data reduces the execution times of GPU operations due to the lack of need to access a video or main system memory for the data, which can be time intensive. This results in improved GPU performance when the same or similar portions of memory are accessed, each time a GPU begins execution. Currently, the GPU does not have a dedicated programmable controller, which provides the functionality of preloading a cache with data.

Given the ever increasing complexity of new software applications, the demands on GPUs to provide efficient and high quality rendering, texture filtering and error correction are also increasing.

SUMMARY OF EMBODIMENTS

Therefore, what are needed are systems and/or methods to alleviate the aforementioned deficiencies. Particularly, what is needed is a dedicated controller which manages the explicit and implicit preloading of a selected APD cache with relevant portions of memory for execution.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner.

Embodiments of the invention, in certain circumstances, include a method and system for preloading a cache. The system comprises an APD electrically coupled to a cache, the system comprising a host processor configured to output a command message, including data related to a portion of a memory, and a controller configured to interpret the command message to (i) identify policy information related to the cache, (ii) determine a location and size of the portion, and (iii) create a fetch message including data related to content of the portion, wherein the controller is configured to output the fetch message to the cache.

Additional embodiments of the invention include a system comprised of an APD electrically coupled to a cache, the system comprising a controller configured to (i) receive a command message, the command message including data explicitly requesting a cache preload of a portion of memory, (ii) identify policy information related to the cache, (iii) determine a location and size of the portion, and (iv) create a fetch message including data related to content of the portion, wherein the controller is configured to output the fetch message to the cache.

Additional features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

The present invention will be described with reference to the accompanying drawings. Generally, the drawing in which an element first appears is typically indicated by the leftmost digit(s) in the corresponding reference number.

DETAILED DESCRIPTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1A:
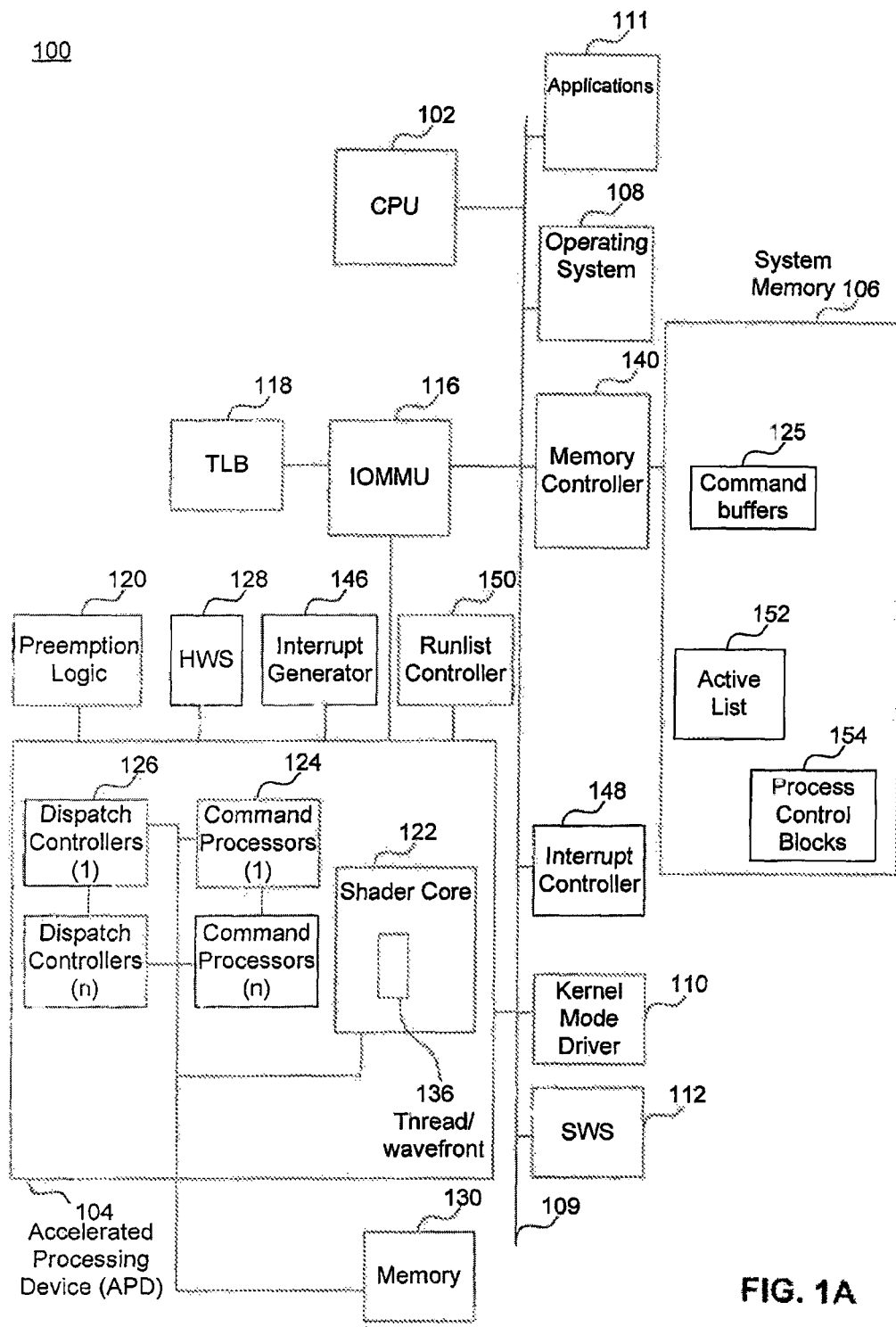
FIG. 1A is an illustrative block diagram of a processing system in accordance with embodiments of the present invention.

FIG. 1A is an exemplary illustration of a unified computing system 100 including two processors, a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as, or nearly as, fluidly as the CPU 102 for some programming tasks. However, it is not an absolute requirement of this invention that the CPU 102 and APD 104 be formed on a single silicon die. In some embodiments, it is possible for them to be formed separately and mounted on the same or different substrates.

In one example, system 100 also includes a system memory 106, an operating system 108, and a communication infrastructure 109. The operating system 108 and the communication infrastructure 109 are discussed in greater detail below.

The system 100 also includes a kernel mode driver (KMD) 110, a software scheduler (SWS) 112, and a memory management unit 116, such as input/output memory management unit (IOMMU). Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1A.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface.

Device drivers, particularly on modern Microsoft Windows® platforms, can run in kernel-mode (Ring 0) or in user-mode (Ring 3). The primary benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user module only through the use of system calls. End user programs like the UNIX shell or other GUI based applications are part of the user space. These applications interact with hardware through kernel supported functions.

CPU 102 can include (not shown) one or more of a control processor, field programmable gate array (FPGA), application specific integrated circuit (ASIC), or digital signal processor (DSP). CPU 102, for example, executes the control logic, including the operating system 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104.

APD 104, among other things, executes commands and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations (e.g., those operations unrelated to graphics such as, for example, video operations, physics simulations, computational fluid dynamics, etc.), based on commands or instructions received from CPU 102.

For example, commands can be considered as special instructions that are not typically defined in the instruction set architecture (ISA). A command may be executed by a special processor, such as a dispatch processor, command processor, or network controller. On the other hand, instructions can be considered, for example, a single operation of a processor within a computer architecture. In one example, when using two sets of ISAs, some instructions are used to execute x86 programs and some instructions are used to execute kernels on an APD compute unit.

In an illustrative embodiment, CPU 102 transmits selected commands to APD 104. These selected commands can include graphics commands and other commands amenable to parallel execution. These selected commands, that can also include compute processing commands, can be executed substantially independently from CPU 102.

APD 104 can include its own compute units (not shown), such as, but not limited to, one or more SIMD processing cores. As referred to herein, a SIMD is a pipeline, or programming model, where a kernel is executed concurrently on multiple processing elements each with its own data and a shared program counter. All processing elements execute an identical set of instructions. The use of predication enables work-items to participate or not for each issued command.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as those that are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in order to process such data elements in parallel. As referred to herein, for example, a compute kernel is a function containing instructions declared in a program and executed on an APD compute unit. This function is also referred to as a kernel, a shader, a shader program, or a program.

In one illustrative embodiment, each compute unit (e.g., SIMD processing core) can execute a respective instantiation of a particular work-item to process incoming data. A work-item is one of a collection of parallel executions of a kernel invoked on a device by a command. A work-item can be executed by one or more processing elements as part of a work-group executing on a compute unit.

In one example, a work-item is one of a collection of parallel executions of a kernel invoked on a device by a command. A work-item is executed by one or more processing elements as part of a work-group executing on a compute unit.

A work-item is distinguished from other executions within the collection by its global ID and local ID. In one example, a subset of work-items in a workgroup that execute simultaneously together on a SIMD can be referred to as a wavefront 136. The width of a wavefront is a characteristic of the hardware of the compute unit (e.g., SIMD processing core). As referred to herein, a workgroup is a collection of related work-items that execute on a single compute unit. The work-items in the group execute the same kernel and share local memory and work-group barriers.

In the exemplary embodiment, all wavefronts from a workgroup are processed on the same SIMD processing core. Instructions across a wavefront are issued one at a time, and when all work-items follow the same control flow, each work-item executes the same program. Wavefronts can also be referred to as warps, vectors, or threads.

An execution mask and work-item predication are used to enable divergent control flow within a wavefront, where each individual work-item can actually take a unique code path through the kernel. Partially populated wavefronts can be processed when a full set of work-items is not available at wavefront start time. For example, shader core 122 can simultaneously execute a predetermined number of wavefronts 136, each wavefront 136 comprising a multiple work-items.

Within the system 100, APD 104 includes its own memory, such as graphics memory 130 (although memory 130 is not limited to graphics only use). Graphics memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown, APD 104 also includes one or "n" number of command processors (CPs) 124. CP 124 controls the processing within APD 104. CP 124 also retrieves commands to be executed from command buffers 125 in memory 106 and coordinates the execution of those commands on APD 104.

In one example, CPU 102 inputs commands based on applications 111 into appropriate command buffers 125. As referred to herein, an application is the combination of the program parts that will execute on the compute units within the CPU and APD.

A plurality of command buffers 125 can be maintained with each process scheduled for execution on the APD 104.

CP 124 can be implemented in hardware, firmware, or software, or a combination thereof. In one embodiment, CP 124 is implemented as a reduced instruction set computer (RISC) engine with microcode for implementing logic including scheduling logic.

APD 104 also includes one or "n" number of dispatch controllers (DCs) 126. In the present application, the term dispatch refers to a command executed by a dispatch controller that uses the context state to initiate the start of the execution of a kernel for a set of work groups on a set of compute units. DC 126 includes logic to initiate workgroups in the shader core 122. In some embodiments, DC 126 can be implemented as part of CP 124.

System 100 also includes a hardware scheduler (HWS) 128 for selecting a process from a run list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run-list 150. The run list management logic of HWS 128 is sometimes referred to as a run list controller (RLC).

In various embodiments of the present invention, when HWS 128 initiates the execution of a process from run list 150, CP 124 begins retrieving and executing commands from the corresponding command buffer 125. In some instances, CP 124 can generate one or more commands to be executed within APD 104, which correspond with commands received from CPU 102. In one embodiment, CP 124, together with other components, implements a prioritizing and scheduling of commands on APD 104 in a manner that improves or maximizes the utilization of the resources of APD 104 resources and/or system 100.

APD 104 can have access to, or may include, an interrupt generator 146. Interrupt generator 146 can be configured by APD 104 to interrupt the operating system 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shader core 122 state, and CP 124 state).

As referred to herein, the term state can include an initial state, an intermediate state, and/or a final state. An initial state is a starting point for a machine to process an input data set according to a programming order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set.

Preemption and context switch logic 120 can also include logic to context switch another process into the APD 104. The functionality to context switch another process into running on the APD 104 may include instantiating the process, for example, through the CP 124 and DC 126 to run on APD 104, restoring any previously saved state for that process, and starting its execution.

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102.

During execution, respective applications, operating system functions, processing logic commands, and system software can reside in memory 106. Control logic commands fundamental to operating system 108 will generally reside in memory 106 during execution. Other software commands, including, for example, kernel mode driver 110 and software scheduler 112 can also reside in memory 106 during execution of system 100.

In this example, memory 106 includes command buffers 125 that are used by CPU 102 to send commands to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to memory 106 can be managed by a memory controller 140, which is coupled to memory 106. For example, requests from CPU 102, or from other devices, for reading from or for writing to memory 106 are managed by the memory controller 140.

Referring back to other aspects of system 100, IOMMU 116 is a multi-context memory management unit.

As used herein, context can be considered the environment within which the kernels execute and the domain in which synchronization and memory management is defined. The context includes a set of devices, the memory accessible to those devices, the corresponding memory properties and one or more command-queues used to schedule execution of a kernel(s) or operations on memory objects.

Referring back to the example shown in FIG. 1A, IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in memory 106.

In the example shown, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, advanced graphics port (AGP), or other such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, operating system 108 includes functionality to manage the hardware components of system 100 and to provide common services. In various embodiments, operating system 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, operating system 108 invokes an appropriate interrupt handling routine. For example, upon detecting a page fault interrupt, operating system 108 may invoke an interrupt handler to initiate loading of the relevant page into memory 106 and to update corresponding page tables.

Operating system 108 may also include functionality to protect system 100 by ensuring that access to hardware components is mediated through operating system managed kernel functionality. In effect, operating system 108 ensures that applications, such as applications 111, run on CPU 102 in user space. Operating system 108 also ensures that applications 111 invoke kernel functionality provided by the operating system to access hardware and/or input/output functionality.

By way of example, applications 111 include various programs or commands to perform user computations that are also executed on CPU 102. CPU 102 can seamlessly send selected commands for processing on the APD 104.

In one example, KMD 110 implements an application program interface (API) through which CPU 102, or applications executing on CPU 102 or other logic, can invoke APD 104 functionality. For example, KMD 110 can enqueue commands from CPU 102 to command buffers 125 from which APD 104 will subsequently retrieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In some embodiments, SWS 112 maintains an active list 152 in memory 106 of processes to be executed on APD 104. SWS 112 also selects a subset of the processes in active list 152 to be managed by HWS 128 in the hardware. In an illustrative embodiment, this two level run list of processes increases the flexibility of managing processes and enables the hardware to rapidly respond to changes in the processing environment. In another embodiment, information relevant for running each process on APD 104 is communicated from CPU 102 to APD 104 through process control blocks (PCB) 154.

Processing logic for applications, operating system, and system software can include commands specified in a programming language such as C and/or in a hardware description language such as Verilog, RTL, or netlists, to enable ultimately configuring a manufacturing process through the generation of maskworks/photomasks to generate a hardware device embodying aspects of the invention described herein.

A person of skill in the art will understand, upon reading this description, that computing system 100 can include more or fewer components than shown in FIG. 1A. For example, computing system 100 can include one or more input interfaces, non-volatile storage, one or more output interfaces, network interfaces, and one or more displays or display interfaces.

Figure 1B:
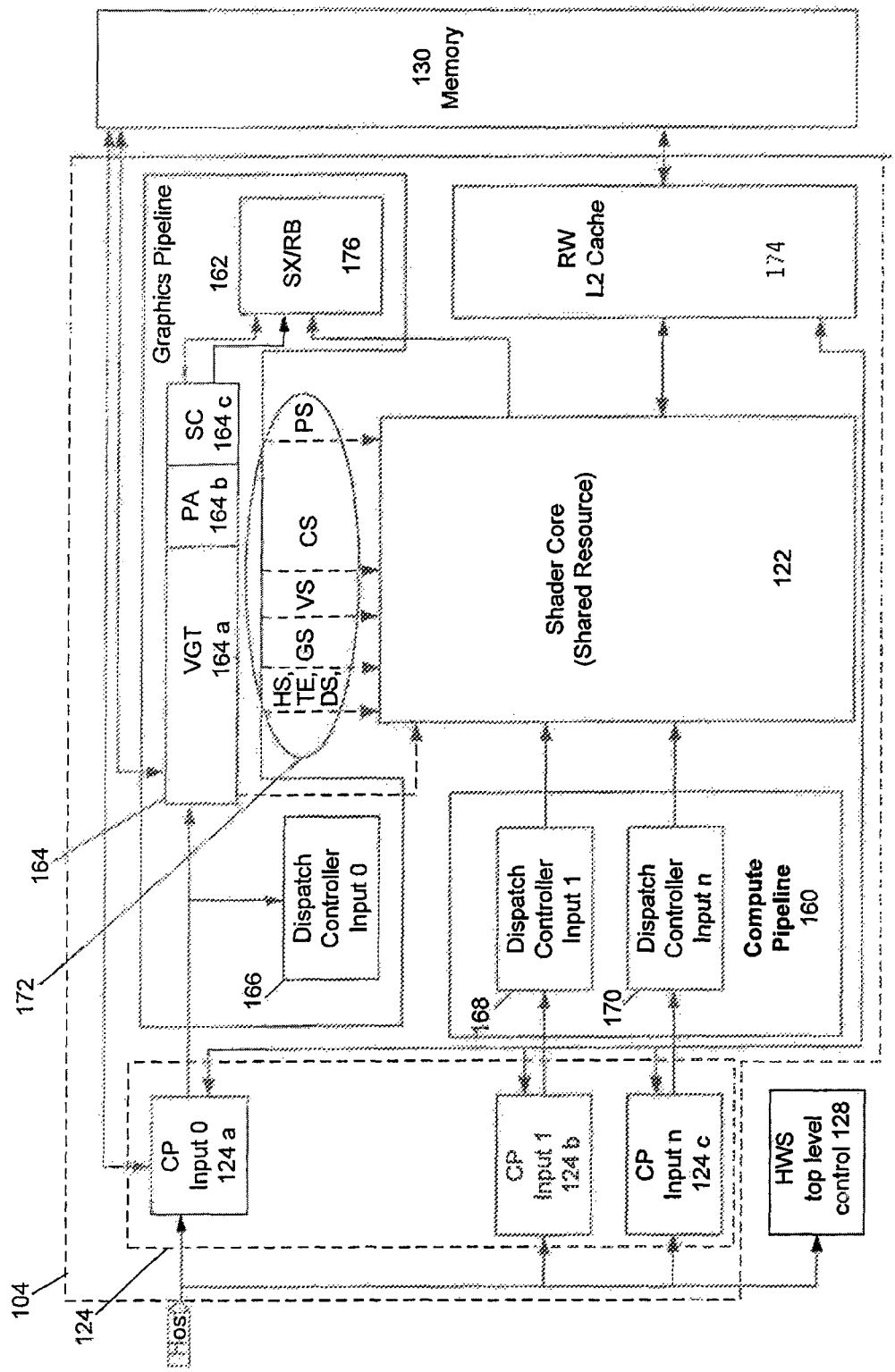
FIG. 1B is an illustrative block diagram illustration of the APD illustrated in FIG. 1A.

FIG. 1B is an embodiment showing a more detailed illustration of APD 104 shown in FIG. 1A. In FIG. 1B, CP 124 can include CP pipelines 124a, 124b, and 124c. CP 124 can be configured to process the command lists that are provided as inputs from command buffers 125, shown in FIG. 1A. In the exemplary operation of FIG. 1B, CP input 0 (124a) is responsible for driving commands into a graphics pipeline 162. CP inputs 1 and 2 (124b and 124c) forward commands to a compute pipeline 160. Also provided is a controller mechanism 166 for controlling operation of HWS 128.

In FIG. 1B, graphics pipeline 162 can include a set of blocks, referred to herein as ordered pipeline 164. As an example, ordered pipeline 164 includes a vertex group translator (VGT) 164a, a primitive assembler (PA) 164b, a scan converter (SC) 164c, and a shader-export, render-back unit (SX/RB) 176. Each block within ordered pipeline 164 may represent a different stage of graphics processing within graphics pipeline 162. Ordered pipeline 164 can be a fixed function hardware pipeline. Other implementations can be used that would also be within the spirit and scope of the present invention.

Although only a small amount of data may be provided as an input to graphics pipeline 162, this data will be amplified by the time it is provided as an output from graphics pipeline 162. Graphics pipeline 162 also includes DC 166 for counting through ranges within work-item groups received from CP pipeline 124a. Compute work submitted through DC 166 is semi-synchronous with graphics pipeline 162.

Compute pipeline 160 includes shader DCs 168 and 170. Each of the DCs 168 and 170 is configured to count through compute ranges within work groups received from CP pipelines 124b and 124c.

The DCs 166, 168, and 170, illustrated in FIG. 1B, receive the input work groups, break the work groups down into wavefronts, and then forward the wavefronts to shader core 122.

Since graphics pipeline 162 is generally a fixed function pipeline, it is difficult to save and restore its state, and as a result, the graphics pipeline 162 is difficult to context switch. Therefore, in most cases context switching, as discussed herein, does not pertain to context switching among graphics processes. An exception is for graphics work in shader core 122, which can be context switched.

After the processing of work within graphics pipeline 162 has been completed, the completed work is processed through a render back unit 176, which does depth and color calculations, and then writes its final results to memory 130.

Shader core 122 can be shared by graphics pipeline 162 and compute pipeline 160. Shader core 122 can be a general processor configured to ran wavefronts. In one example, all work within compute pipeline 160 is processed within shader core 122. Shader core 122 runs programmable software code and includes various forms of data, such as state data. Shader core 122 is coupled to RW L2 cache 174.

Figure 2:
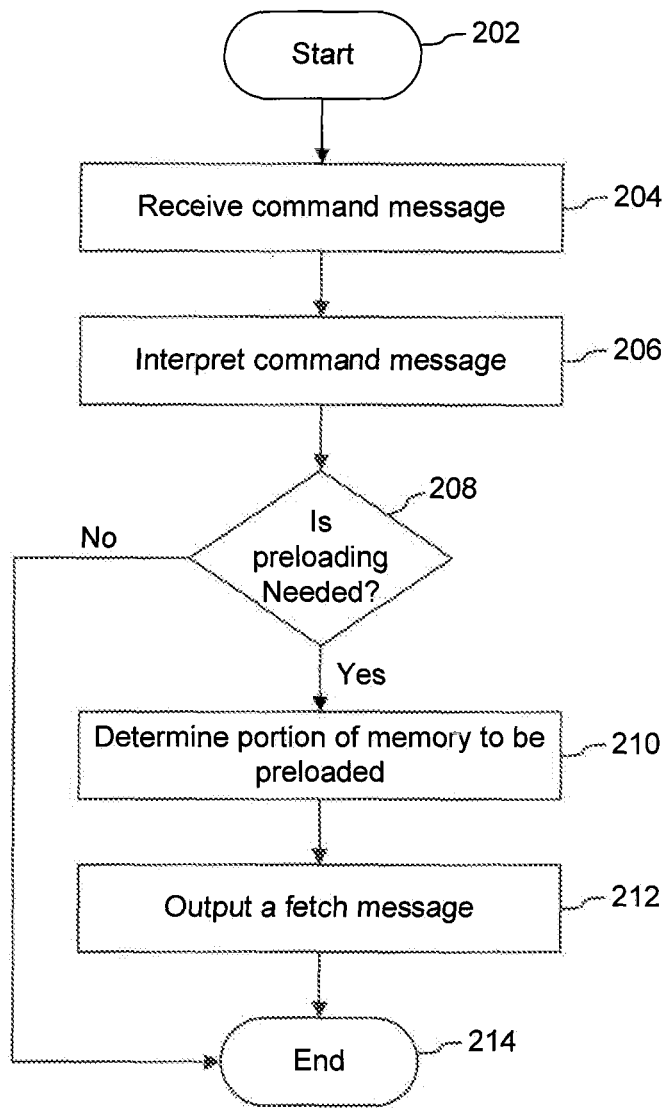
FIG. 2, is an illustrative flowchart of an APD preloading a cache with a portion of memory, according to an embodiment.

FIG. 2 is a flowchart depicting an exemplary method 200, according to an embodiment of the present invention. Method 200 can operate on system 100 of FIGS. 1A and 1B, which is referenced throughout the description of FIG. 2. In one example, method 200 can be used for preloading a cache of an APD, such as RW L2 Cache 174 of APD 104. The method 200 may or may not occur in the order shown, or require all of the operations.

Method 200 starts at operation 202 and continues to operation 204, in which a command message is received by a controller. According to an embodiment, a host processor is configured to output a command message including data related to a portion of a memory. The host processor may, for example be CPU 102. The command message may include data related to a portion of memory, such as graphics memory 130. According to an embodiment, the command message includes instructions to be processed by the APD related to pixel operations, geometric computations, and rendering an image to a display. In general, a stream of command messages may be received by the controller. The controller may be, for example, but not limited to, CP 124 of APD 104. It will be understood by one skilled in the art, that a dedicated controller, other than CP 124, may be configured to receive the command message.

In operation 206, the command message is interpreted, for example, by command processor 124. As discussed above, the command message can include data related to a series of operations or computations to be performed by the APD. The command message may include a list of instructions, each instruction including data related to a portion of memory to be accessed during the processing of the instructions by APD 104. For example, the command message may include a reference pointer to a portion of graphics memory 130, which may contain pixel data or constants which may be used during processing to render an image to a display.

According to an embodiment, the interpretation of the command message includes determining which portion of memory to preload into a cache. In an embodiment, the portion of memory to be preloaded is determined based on locality of reference information. This locality is based on the principle that the APD does not access all of its data at once, with equal probability. The locality of reference information may be based on a temporal locality of a portion of memory.

For example, if the command message includes instructions referencing a particular portion of memory, there is a high probability that the same portion of memory will be referenced again in the near future. The locality of reference information, for example, may be based on a spatial locality. For instance, if the command message includes instructions referencing a particular portion of memory, there is a high probability that data residing in a nearby portion of memory will also be referenced in the near future.

In operation 208, it is determined whether pre-loading is needed. In the example of FIG. 2, the pre-loading determination is performed by CP 124. According to an embodiment, the controller (e.g., CP 124) can be configured to track the access history of a cache. During the processing of a command message, an instruction may access a memory location, such as a location within memory 130. When an instruction accesses the memory location, the APD first checks whether the memory location is replicated in a cache. Specifically, the address associated with the memory access is compared to all tags in a cache. If the desired memory location is found in the cache, a cache hit occurs. APD 104 immediately reads or writes the information such as data or instructions in the identified cache line. If the desired memory location is not found within the cache, this is considered a cache miss, which results in data retrieval from another source, such as graphics memory 130.

According to an embodiment, upon receipt and interpretation of a command message, the CP 124 is configured to determine whether preloading is necessary based on the cache access history. The data that resulted in a cache hit or cache miss is deemed to be data that has a high probability of being accessed again. Information related to this data and its location in a portion of the graphics memory 130 is logged and stored in a database by CP 124. Upon receipt of a command message, CP 124 is configured to compare the instructions of the command message with the cache access history stored in the database. When the command message data related to the memory location is similar to any data within cache access history database, preloading is necessary. Method 200 may proceed to operation 210 upon a determination that preloading is necessary. If preloading is not necessary, method 200 ends at operation 214.

In operation 210, the portion of memory to be preloaded is determined. For example, the portion of memory to be preloaded is determined by CP 124. According to an embodiment, the portion of memory to be preloaded is based on the locality of reference information. As discussed previously, the portion of memory to be preloaded may be based on temporal or spatial locality of the portion of the memory. Once CP 124 identifies the portion of memory referenced in the command message instruction, the same portion of memory, along with memory residing in adjacent or nearby memory blocks, may be identified as portions of memory to be preloaded.

According to another embodiment, the portion of memory to be preloaded is based on the policy information of the cache. Policy Information for a cache may determine when a cache block is written. For example, if the policy information associated with a cache block is "allocate on read only," the cache block will not be modified during write operations. If the policy information associated with a cache block is "allocate on read and write", then the cache block may be updated during both write and read operations. In addition, when the system includes multiple caches, the policy information may determine which cache is used to store certain information. The policy information of a cache determines how the identified portion of memory to be preloaded will be stored in the cache.

In operation 212, a fetch message is output. For example, the fetch message is output by CP 124 to the specified cache, such as RW L2 Cache 174. Once the portion of memory to be preloaded is identified, a fetch message is generated by CP 124 including data related to the policy information. According to an embodiment, the fetch message causes the cache to load data from the portion of memory based on the policy information. Method 200 then ends at operation 214.

Figure 3:
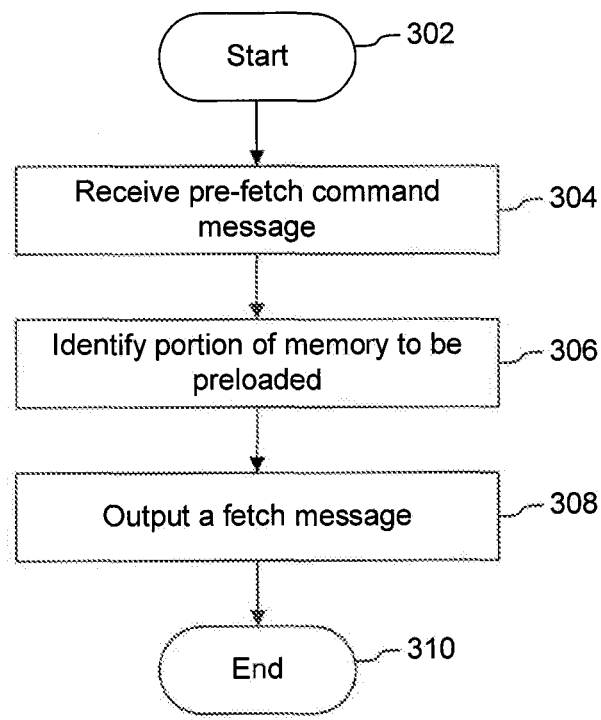
FIG. 3 is another illustrative flowchart of an APD preloading a cache with a portion of memory, according to an embodiment.

FIG. 3 is a flowchart depicting an exemplary method 300, according to an embodiment of the present invention. The method 300 can operate on system 100 of FIGS. 1A and 1B, which is referenced throughout the description of FIG. 3. In one example, method 300 can be used for preloading a cache of an APD, such as RW L2 Cache 174 of APD 104. The method 300 may or may not occur in the order shown, or require all of the operations.

Method 300 starts at operation 302 and continues to operation 304, a command message is received by a controller. According to an embodiment, a host processor is configured to output a command message including prefetching instructions. The host processor may, for example be CPU 102. According to an embodiment, the command message includes preload instructions, which explicitly identify a portion of memory to be preloaded into a cache. For example, the preload instructions may include a physical address of the portion of memory to be preloaded into RW L2 Cache 174 of APD 104. Alternatively, the preload instructions may include a virtual address of the portion of memory to be preloaded into RW L2 Cache 174. A virtual address is a location of the portion of memory in virtual memory. A virtual address may be mapped to many different physical addresses. In the embodiment, the CP 124 is configured to make a call to a memory management unit (MMU), such as IOMMU 116, to translate the virtual address into a physical address of the portion of memory.

In operation 306, the portion of memory to be preloaded is determined, for example, by CP 124. According to an embodiment, the portion of memory to be preloaded is based on the physical address included in the command message. The physical address explicitly identifies the location of the portion of memory to be preloaded into a cache. The memory portion to be preloaded is based on the virtual address included in the command message. After translating the virtual address included in the command message into a physical address, the exact location of the portion of memory to be preloaded will be identified.

In an embodiment, the portion of memory to be preloaded may also be based on temporal or spatial locality of the portion of the memory. Once CP 124 determines the location of the portion of memory identified by the physical address or virtual address, the same portion of memory, along with memory residing in adjacent or nearby memory blocks, may be identified as portions of memory to be preloaded. In an embodiment, policy information about the cache may be used to determine when and how much of the portion of the identified memory to preload into the cache.

In operation 308, a fetch message is output, for example, by CP 124 to a cache controller of RW L2 Cache 174. Once the portion of memory to be preloaded is identified, a fetch message is generated by CP 124 including data related to this information. According to an embodiment, the fetch message causes the cache to load data from the portion of memory. Method 300 then ends at operation 310.

The present invention may be embodied in hardware, software, firmware, or any combination thereof. Embodiments of the present invention or portions thereof may be encoded in many programming languages such as hardware description languages (HDL), assembly language, C language, and netlists etc. For example, an HDL, e.g., Verilog, can be used to synthesize, simulate, and manufacture a device, e.g., a processor, application specific integrated circuit (ASIC), and/or other hardware element, that implements the aspects of one or more embodiments of the present invention. Verilog code can be used to model, design, verify, and/or implement a processor that can scale frames using content-aware seam carving.

For example, Verilog can be used to generate a register transfer level (RTL) description of logic that can be used to execute instructions so that a frame can be scaled using content-aware seam carving. The RTL description of the logic can then be used to generate data, e.g., graphic design system (GDS) or GDS II data, used to manufacture the desired logic or device. The Verilog code, the RTL description, and/or the GDS II data can be stored on a computer readable medium. The instructions executed by the logic to perform aspects of the present invention can be coded in a variety of programming languages, such as C and C++, and compiled into object code that can be executed by the logic or other device.

Aspects of the present invention can be stored, in whole or in part, on a computer readable media. The instructions stored on the computer readable media can adapt a processor to perform the invention, in whole or in part, or be adapted to generate a device, e.g., processor, ASIC, other hardware, that is specifically adapted to perform the invention in whole or in part. These instructions can also be used to ultimately configure a manufacturing process through the generation of maskworks/photomasks to generate a hardware device embodying aspects of the invention described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system including an accelerated processing device electrically coupled to a cache, the system comprising:
  a controller configured to:
    receive a command message, the command message including instructions to be accessed during processing by the accelerated processing device, the instructions comprising data related to a portion of a plurality of portions of memory;
    interpret the command message by determining whether or not the command message includes a preloading instruction to preload, to the cache, the portion of the memory to be accessed;
    on the condition that the command message is determined to include the preloading instruction, determine to preload, to the cache, at least the portion of the memory;
    on the condition that command message is determined to not include the preloading instruction, compare the instructions of the command message to cache access history and determine to preload, to the cache, at least the portion of the memory based on a comparison of the command message to the cache access history;
    determine which of the plurality of portions of the memory to preload to the cache based on at least one of: (i) locality reference information and (ii) policy information of the cache;
    create a fetch message including data related to contents of the portion; and
    output the fetch message to the cache.

2. The system of claim 1, further comprising:
  a host processor configured to output the command message including data related to the portion of the memory.

3. The system of claim 1, wherein
  the policy information determines:
    how the portion of the memory to be preloaded is stored in the cache; and
    when a block in the cache is written, either (1) read only or (2) read and write, and
  the fetch message causes the cache to load the data from the portion of the memory based on the policy information.

4. The system of claim 1, wherein the command message includes the locality reference information.

5. The system of claim 1, wherein the locality reference information is based on a temporal locality of the portion of the memory.

6. The system of claim 1, wherein the locality reference information is based on a spatial locality of the portion of the memory.

7. The system of claim 1, wherein the controller is further configured to interpret the command message by determining whether or not the command message includes a preloading instruction having a physical address for each portion of the memory.

8. The system of claim 1, wherein the controller is further configured to interpret the command message by determining whether or not the command message includes a preloading instruction having a virtual address for the portion of the memory.

9. The system of claim 8, wherein the controller is further configured to translate the virtual address into a physical address for the portion of the memory.

10. A computer implemented method for preloading a cache, comprising:
  receiving a command message, the command message including instructions to be accessed during processing by an accelerated processing device, the instructions comprising data related to a portion of a plurality of portions of memory;
  interpreting the command message by determining whether or not the command message includes a preloading instruction to preload, to the cache, the portion of the memory to be accessed;

on the condition that the command message is determined to include the preloading instruction, determine to preload, to the cache, at least the portion of the memory;

on the condition that command message is determined to not include the preloading instruction, compare the instructions of the command message to cache access history and determine to preload, to the cache, at least the portion of the memory based on a comparison of the command message to the cache access history;

determining which of the plurality of portions of the memory to preload to the cache based on at least one of: (i) identified locality reference information and (ii) identified policy information of the cache creating a fetch message including data related to contents of the portion; and sending the fetch message to the cache.

11. The method of claim 10, wherein the policy information determines:

how the portion of the memory to be preloaded is stored in the cache; and when a block in the cache is written, either (1) read only or (2) read and write, and the fetch message causes the cache to load data from the portion of the memory.

12. The method of claim 10, wherein the command message includes the locality reference information.

13. The method of claim 10, wherein the locality of reference information is based on a temporal locality of the portion of the memory.

14. The method of claim 10, wherein the locality of reference information is based on a spatial locality of the portion of the memory.

15. The method of claim 10, wherein interpreting the command message further includes determining whether or not the command message includes a preloading instruction having a virtual address for the portion of the memory.

16. The method of claim 15, further comprising:

translating the virtual address into a physical address for the portion of the memory.

17. The method of claim 10, wherein interpreting the command message further includes determining whether or not the command message includes a preloading instruction having a physical address for the portion of the memory.

\* \* \* \* \*